Aug. 15, 1961 A. J. MULLIKIN 2,995,770
GIMBALED CASTER
Filed March 18, 1959

ARTHUR J. MULLIKIN
INVENTOR.

BY *Loyal J. Miller*

ATTORNEY

United States Patent Office  2,995,770
Patented Aug. 15, 1961

2,995,770
GIMBALED CASTER
Arthur J. Mullikin, Oklahoma City, Okla.
(3001 E. Osie, Wichita, Kans.)
Filed Mar. 18, 1959, Ser. No. 800,333
5 Claims. (Cl. 16—21)

The present invention relates generally to casters for supporting various articles in a mobile manner.

The prior art reveals a large number of casters of varied designs of the swivel and locking type for fixing the position of the article supported. However, those casters providing a locking means or arrangement for supporting wheels do not, as far as I have been able to learn, provide a means for increasing the support area at the point of contact of the supporting wheel with a supporting surface. It is well understood that the use of casters for supporting heavy articles, such as furniture of various kinds, results in an indentation or recess being formed on the surface of the supporting area by reason of the gravitational attraction for the mass of the article being supported and because of the relatively small supporting area at the point where the wheel contacts the supporting surface. This is particularly true where the supporting surface comprises a floor with a covering such as linoleum, rugs, or the like.

It is, therefore, the principal object of the instant invention to provide a caster having a pair of supporting wheels which will support a desired article in a mobile manner and wherein the wheels may be manually rotated about an axis perpendicular to the axis of rotation of the wheels for positioning one side surface of either wheel in contact with the support surface.

Another object is to provide a caster of this class having bracket means which may be pivotally connected to the lower surface of an article to be supported on a vertical axis off-set with respect to the points of contact of the supporting wheels, with the support surface, whereby the caster will pivot rearwardly in a trailing manner when the supported article is moved across the support surface.

Another object is to provide a dual wheeled type caster wherein the axle common to both wheels is free to pivot about a horizontal axis perpendicular to the wheel axis whereby the wheels may tilt or pivot laterally when rolling across rough or uneven surfaces when moving a supported article.

Another object is to provide a dual wheeled caster of this character wherein the spacing between a vertical center line through the central point of the axle and the outer surface of each respective wheel is equal to the radius of each wheel, thus permitting either one of the wheels to be rotated to a wheel side supporting position, thus securing the supported article in a selected position without changing or altering the height of the caster and thereby increasing the stability of the supporting caster.

Still another object is to provide a caster of this class wherein, when the wheels are turned or rotated to a fixed position, the center of gravity of the article supported will be lowered, thus providing a firm support.

Yet another object is to provide a caster of this class wherein the dual wheels thereof may be manually rotated to a fixed supporting position and which will, by gravitational attraction for the caster, rotate the wheels back to a rolling position when the weight of the article is removed from the caster.

A further object is to provide a caster wherein the supporting bracket or yoke may be rigidly connected to any selected device which is desired to be moved in a mobile manner such as hand trucks or the like.

The present invention accomplishes these and other objects by providing a substantially U-shaped bracket or yoke having a rectangular upper plate adapted to be connected to the lower surface of an article to be supported. The bracket or yoke includes a pair or spaced-apart parallel depending arms which journal a cross-member therebetween on a horizontal axis. One side of the cross-member is enlarged or extended laterally of the horizontal axis. A pair of wheels are rotatably mounted on opposing ends of an axle extended through the cross-member perpendicular with respect to the horizontal axis of the cross-member.

Other objects will be apparent from the following description when taken in conjunction with the accompanying single sheet of drawings, wherein.

Like characters of reference designate like parts in those figures of the drawings in which they occur.

In the drawings.

Figure 1:
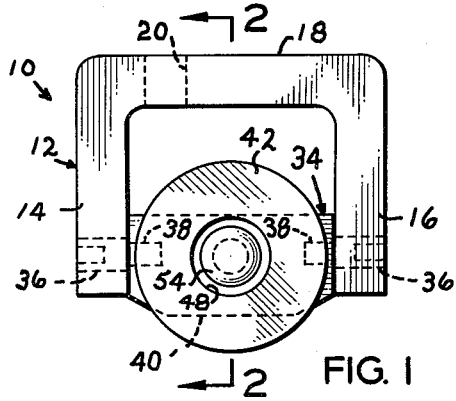
FIGURE 1 is a side elevational view of the device, per se.
Figure 2:
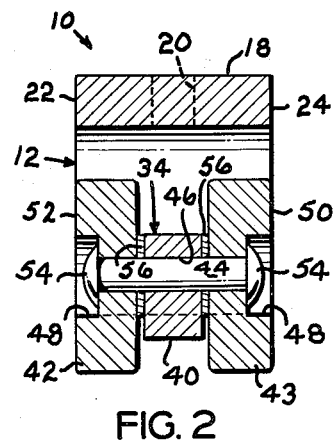
FIGURE 2 is a vertical cross-sectional view taken substantially along the line 2—2 of FIG. 1.

The reference numeral 10 indicates the device, as a whole, including an inverted U-shaped member or yoke 12, rectangular in cross section, having legs 14 and 16. The bight portion 18, of the U-shaped member is provided with a bore or aperture 20 centrally disposed between its opposing sides 22 and 24 and adjacent the leg 14 for receiving a spindle or pin 26 having a bearing 28 in contact wtih the upper surface of the bight portion 18. The pin 26 is adapted to enter a vertical downwardly open bore or recess in the lower surface 30 of an article to be supported in a mobile manner wherein a contact plate 32 is interposed between the bearing 28 and the surface 30 thus permitting pivotal rotation of the U-shaped member 12 about the vertical axis of the pin 26. Obviously the bearing 28 acts to support the weight carried by the member 12 and permits greater ease of rotation of the member 12. It is to be understood that the pin 26 and bearing 28 arrangement is by way of example only since it seems readily apparent that the member 12 may be connected to an article to be supported in any number of more or less conventional ways. In some installations it may be desirable to secure the member 12 to the lowermost surface of the article being supported by bolt and nut means, not shown, extended through the aperture 20.

A cross-member 34, substantially rectangular in cross section, extends horizontally and is freely received between the lower end portions of the legs 14 and 16. The cross-member 34 is pivotally connected at each end, respectively, for rotation about a horizontal axis formed by a pair of set screws 36 threadedly secured within suitable threaded bores formed medially the transverse width of the respective legs 14 and 16. Each of the set screws 36 is provided with a reduced inwardly disposed end portion 38 which is cooperatively received freely within suitable aligned bores in the respective opposing ends of the cross-member 34. One side portion of the cross-member 34 is enlarged or extended laterally of the horizontal axis formed by the set screws 36, as at 40, so that gravitational attraction will cause the cross-member 34 to pivot toward a position wherein the cross-member side 40 is disposed downwardly fro the purposes more fully explained hereinbelow.

A pair of rollers or wheels 42 and 43 are journaled on opposing sides of the cross-member 34 on the opposing ends of an axle 44 received by a transverse bore 46 through the cross-member thus forming a horizontal axis for the wheels 42 and 43 perpendicular with respect to the horizontal axis of the cross-member. Each of the wheels 42 and 43 have a central recess 48 in the respective outwardly disposed flat side surface or face 50 and 52. Diametrically the recesses 48 are each slightly greater than the diameter of the bore 46 for receiving the respective bradded or rivet-like head ends 54 of the axle 44 so that these heads 54 do not project outwardly beyond the limit of the respective outwardly disposed surfaces 50 and 52 of the wheels. Obviously the axle might be provided with nut means, not shown, rather than the rivet type heads, if desired. Similarly, the wheels 42 and 43 or the axle 44 or both may be provided with conventional ball or roller bearings if desired. A spacer or washer 56 is interposed between each of the respective wheels and the adjacent side of the cross member 34 to reduce the frictional contact between the wheels and the cross-member when the wheels are turning.

As shown in the drawings the transverse width of the yoke 12 including the arms 14 and 16 is preferably equal to the distance between the outer surfaces 50 and 52 of the wheels and the spacing between the arms 14 and 16 is preferably slightly greater than the diameter of the wheels. Obviously the depending length of the arms 14 and 16 must be slightly greater than the radius of the wheels.

Operation

In operation the desired number of casters 10 are connected to the article to be supported as disclosed hereinabove. The supported article may then be moved across a supporting surface in a conventional manner wherein the wheels 42 and 43 support the article in a mobile manner by rolling across the supporting surface. When the supported article is positioned in a desired place the wheels 42 and 43 may be manually rotated by lifting the supported article and caster 10 enough to position the wheels slightly above the supporting surface and manually turning or pivoting the cross member 34 90° in either direction about its horizontal axis.

Obviously the length of the arms 14 and 16 must be great enough to permit positioning the horizontal axis of the cross-member 34, formed by the screws 36, in spaced relation with respect to the lower surface of the bight portion 18 a distance slightly greater than the distance between the longitudinal center of the axle and the outwardly disposed circumferential arc of the respective wheel surface 50 or 52. This positions the surface 50 or 52 of the respective wheel in contact with the supporting surface. Since the respective wheel side surface 50 or 52 is substantially greater in area than the point contact of the respective wheel, when in rolling position, the weight of the article is distributed over a greater area. Similarly this increased area of support anchors or secures the supported article against being moved easily.

By way of example only, this caster is particularly adaptable for use in connection with a typewriter stand wherein it is frequently desired to move the stand and supported typewriter from place to place and yet, when typing is to be done, it is highly desirable to secure the stand against rolling movement. In such an installation one, two or all four of the pairs of wheels of the respective casters may be pivoted to a secured position and when it is later desired to move the stand the same may be manually raised off the supporting floor a distance slightly greater than the radius of the wheels thereby permitting gravitational attraction for the laterally weighted cross-member 34 to pivot the wheels to a rolling position. Similarly, four of the casters 10 may be used to support a bed, or the like, and the wheel of only one caster pivoted to a wheel face surface contacting position thereby permitting the bed to be manually moved across the supporting floor wherein the single wheel-rotated caster acts as a vertical pivoting axis as, for example, when pulling the bed away from a confined area in a room for making the bed and thereafter repositioning the bed in the previous position.

Figure 3:
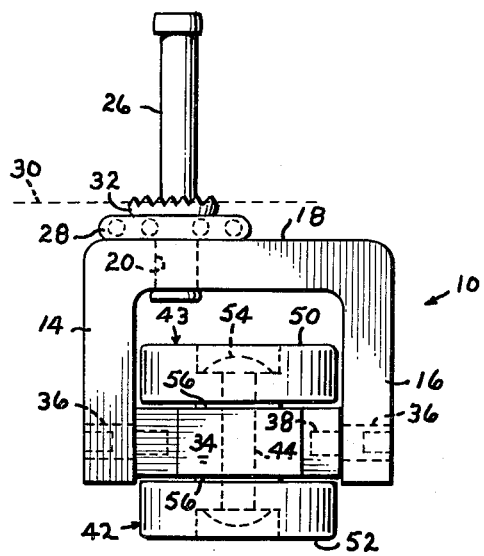
FIGURE 3 is a side elevational view, illustrating the caster in article supporting position and illustrating the dual wheels pivoted to a fixed supporting position; and, FIGURE 4 is an end elevational view of the caster, per se, in the position illustrated by FIG. 3.
Figure 4:
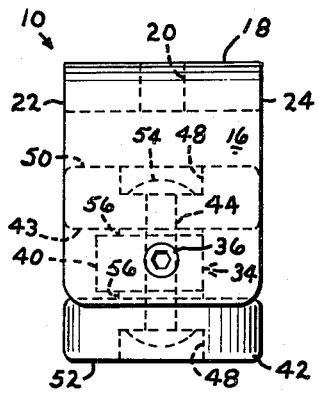

As illustrated in FIG. 3, the respective surface 50 or 52 of the wheels forms a vertical line of support between the supporting surface and the mass of the article being supported rather than the line of support being off-set with respect to the spindle or pin 26 when in the position illustrated in FIG. 1. This feature reduces the moment of stress and strain the caster and supporting pin is subjected to when supporting heavy articles such as a piano or the like. Obviously, if desired, the washers 56 may be omitted to further reduce the lateral stress placed upon the axle 44 when the caster is used in connection with heavy equipment.

The caster may be modified, if desired, for using a single wheel by increasing the width of the cross-member and forming a recess therein for receiving and journaling a single wheel.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A combination caster and stationary support, comprising: a yoke having a bight portion and depending legs at the opposite ends of the bight portion; means for rotatably securing said bight portion to an article to be supported by the caster for turning movement of the yoke in a horizontal plane; a cross-member journaled at its opposite ends to said legs for turning movement about a horizontal axis; and a pair of rollers rotatably secured in end-to-end spaced relation to an intermediate portion of said cross-member for rotation about a common axis extending at right angle to said horizontal axis, the outer faces of said rollers being flat to provide stationary supporting surfaces and said rollers being positioned on opposite sides of said cross-member and of a size permitting movement of the rollers between said legs and under the bight portion of said yoke between upright rolling, and horizontal, stationary supporting, positions upon rotation of said cross-member about said horizontal axis.

2. Structure as specified in claim 1, and weighting means carried by said cross-member laterally of its horizontal axis for turning said rollers to one of said positions.

3. Structure as specified in claim 1 in which the distance between the horizontal axis of said cross-member and the outer face of each said roller is equal to the radius of each said roller.

4. Structure as specified in claim 3, and weighting means forming a part of said cross-member and extending laterally of its horizontal axis for rotating the axis of said rollers to a horizontal position when the caster is lifted off of its supporting surface.

5. A combination caster and stationary support, comprising: a yoke having a bight portion defined by a flat horizontal upper surface and depending legs at the opposite ends of the bight portion; spindle means extending vertically through said bight portion for connecting the bight portion of said yoke to an article to be supported for turning movement of the bight portion in a horizontal plane; a cross-member journaled horizontally between the depending legs of the yoke; an axle secured to said cross-member perpendicular to the horizontal axis of the latter; and wheel means journaled on the axle, the outer faces of said wheel means being flat to provide stationary supporting surfaces and the diameter of said wheel means being less than the spacing between the inner-surfaces of said legs and the distance between the horizontal axis of said cross-member and the undersurface of said bight portion.

References Cited in the file of this patent

UNITED STATES PATENTS

| | | |
|---|---|---|
| 314,955 | Mendenhall | Mar. 31, 1885 |
| 348,052 | Pleukharp | Aug. 24, 1886 |
| 1,106,853 | Smouse | Aug. 11, 1914 |
| 2,683,277 | Bernaerts | July 13, 1954 |

FOREIGN PATENTS

| | | |
|---|---|---|
| 14,066 | Great Britain | June 18, 1913 |
| 26,753 | Great Britain | Dec. 19, 1898 |